(12) United States Patent
Lile

(10) Patent No.: US 6,759,635 B2
(45) Date of Patent: Jul. 6, 2004

(54) COOKING SYSTEM FOR SENSING THE STATUS OF A FOOD ITEM

(75) Inventor: Lawrence Lile, Columbia, MO (US)

(73) Assignee: Salton, Inc., Lake Forest, IL (US)

(*) Notice: Subject to any disclaimer, the term of this patent is extended or adjusted under 35 U.S.C. 154(b) by 22 days.

(21) Appl. No.: 10/044,619

(22) Filed: Jan. 10, 2002

(65) Prior Publication Data

US 2003/0127451 A1 Jul. 10, 2003

(51) Int. Cl.⁷ .............................................. H05B 1/02
(52) U.S. Cl. ........................ 219/497; 219/506; 219/494
(58) Field of Search ................................ 219/385, 389, 219/391, 412–413, 443.1, 445.1, 446.1, 447.1, 448.11, 448.12, 448.13, 448.14, 450.1, 482, 489, 490–492, 494, 497, 506, 702; 426/231, 523, 233; 165/231, 238, 265, 12

(56) References Cited

U.S. PATENT DOCUMENTS 4,884,626 A * 12/1989 Filipowski .................. 219/679
6,299,920 B1 * 10/2001 Saksena ...................... 426/233

* cited by examiner

Primary Examiner—Tu Ba Hoang
(74) Attorney, Agent, or Firm—Sonnenschein Nath & Rosenthal LLP

(57) ABSTRACT

A system for determining the status of a food item using time-temperature data. The system includes a method comprising, sensing a number of temperatures associated with a food item, comparing data related to the sensed temperatures with predetermined temperature data, determining the status of the food item based on the comparison, and causing a predetermined action based on the status of the food item. The method may further involve inputting user information corresponding to the food item, which may include type of food, or the desired level of doneness. The system also includes an apparatus for determining the status of a food item. This apparatus may include a sensor for sensing a plurality of temperatures, a means for determining the status of the food item based on the plurality of temperatures, and an indicator for indicating the status of the food item. The determining means may include a microprocessor. The apparatus may further, include a control sensor.

82 Claims, 11 Drawing Sheets

COOKING SYSTEM FOR SENSING THE STATUS OF A FOOD ITEM

BACKGROUND OF THE INVENTION

1. Technical Field

The invention relates to cooking appliances, and more particularly, to a food cooking system having a sensor for determining information about the food being cooked.

2. Related Art

Conventional cooking appliances such as ovens, griddles, and waffle irons, use thermostats to control the cooking temperature of the appliance. Thermostats control cooking temperatures by turning heating elements "on" or "off" to maintain a constant temperature at a particular location such as, for example, in the cavity of an oven, at the surface of a griddle, or in or near the food.

Some prior efforts have been made to use thermostats to determine the status of a food item. For example, some prior art waffle irons illuminate a "ready" light (or sound a "ready" tone), indicating that the waffle being cooked is done. In these prior approaches, the appliance's fixed temperature thermostat energizes the heating element in response to a cold batter being poured onto the waffle iron. When the thermostat detects that a fixed predetermined temperature has been reached by the heating element, the thermostat deenergizes the heating element, and illuminates the ready light. Operating based on a fixed predetermined temperature (set by the calibration of the thermostat) has certain disadvantages. For instance, under this prior approach, the ready light or tone is triggered at this predetermined temperature, even if the waffle is not yet done, or is over done. Furthermore, since the prior art waffle iron operates only based on a fixed, predetermined temperature, it does not adapt well to particular situations such as differences in waffle recipes that may require a higher or a lower temperature, or to differing food types altogether. In addition, with the prior art waffle irons, at the particular moment when batter is added to the cooking surface, the fixed temperature thermostat may be below the fixed temperature setting, in which case the appliance cannot detect when the food is added. In other words, since the fixed temperature thermostat, under such circumstances, already requires additional heating, the need for additional heating can not change in response to the addition of a food load. This prevents the appliance from having the capability of timing the cooking cycle, and it can only rely on a fixed temperature threshold to indicate when a food might be done. This is a less reliable method of determining the status or doneness of a food item. Thus, there is a need in the cooking art for a cooking system that is able to determine the status of a food item (e.g., when a food item is added to a cooking apparatus or flipped), to automatically determine the beginning of a cooking cycle, or when a food item is done. There is a further need in the art to provide appliances that can control the cooking of various foods based on such determination.

SUMMARY

These and other advances in the art are provided by the disclosed system. The system may be embodied in various methods and apparatuses for determining the status of a food item. The system examines the time-temperature curve at either the food item or the cooking medium toward determining, for example, when a user has added a food item to a cooking medium, when a food item has been flipped, or when a food item is done (i.e. finished cooking). In particular, the system may sense a number of temperatures, and/or compare data related to the sensed temperatures with predetermined temperature data (for example, delta set-points as described in detail below), toward determining the status of the food item. The system may also heat the food item, and may further cause some predetermined action based on the status of the food item.

The system may involve inputting user information corresponding to the food item being cooked. This user information may include what type of food the food item is, or the desired level of doneness of the food item. Also, the system may identify a delta value from a plurality of delta values, determine from the currently determined delta values that a food item has been introduced to the heating medium, and heat the food item for a predetermined period of time. Alternatively, the system may heat the food item until it reaches a predetermined temperature value, regardless of heating time. In addition, the system may also automatically shut off the heating medium in certain circumstances after a predetermined period of time, such as a period of nonuse.

Other systems, methods, features and advantages of the invention will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principals of the invention. Moreover, in the figures, like reference numerals designate corresponding parts throughout the different views.

DETAILED DESCRIPTION OF THE PREFERRED EMBODIMENTS

Figure 1A:
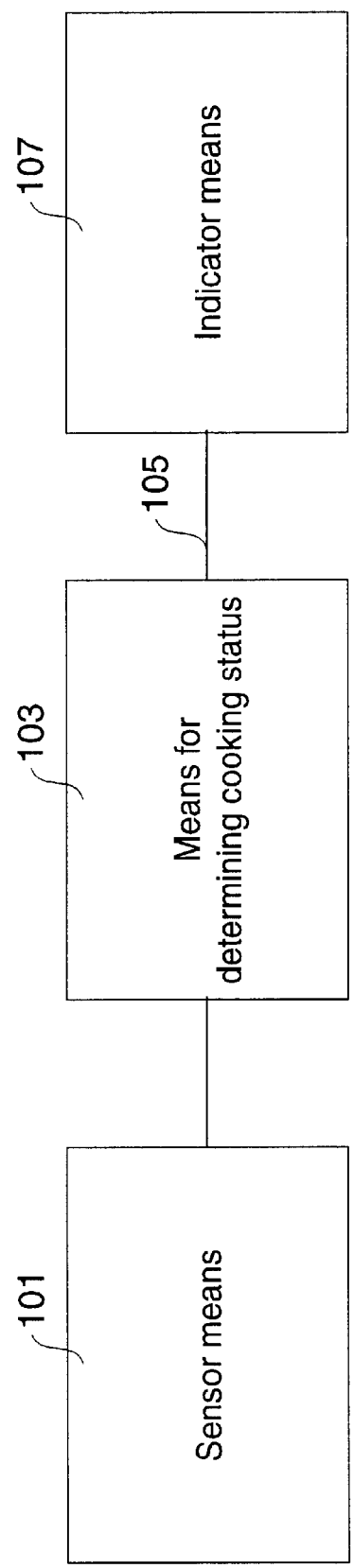
FIG. 1A is a block diagram showing a control means for use with this invention.

FIG. 1A illustrates a general block diagram showing a control means for an appliance in accordance with this invention. The control means generally includes a sensor means 101, a means for determining the status and/or doneness of a food item 103, and an indicator means 107. Certain specific embodiments of each of these means are described in detail with respect to FIGS. 1B, 1C, 2 and 3.

The sensor means 101 may be, for example, one or more heat sensors for sensing temperatures. In accordance with the invention, all or part of the sensor means 101 is put into thermal relationship with a food item or items. The sensor means 101 senses one or more successive temperatures over time. The sensed temperatures are generally sent to a means for determining the status or doneness of the food item or items 103, and the determining means 103 generates a status signal 105 which is sent to an indicator means 107.

The determining means 103 may include, for example, a microprocessor, an arithmetic logic unit (ALU), an analog circuit, or an application-specific integrated circuit (ASIC). As explained below, the status is determined based on successively sensed temperatures over time. Based on the status signal 105, the indicator means 107, which is operably associated with the determining means 103, operates to indicate the status of the food item to a user.

Figure 1B:
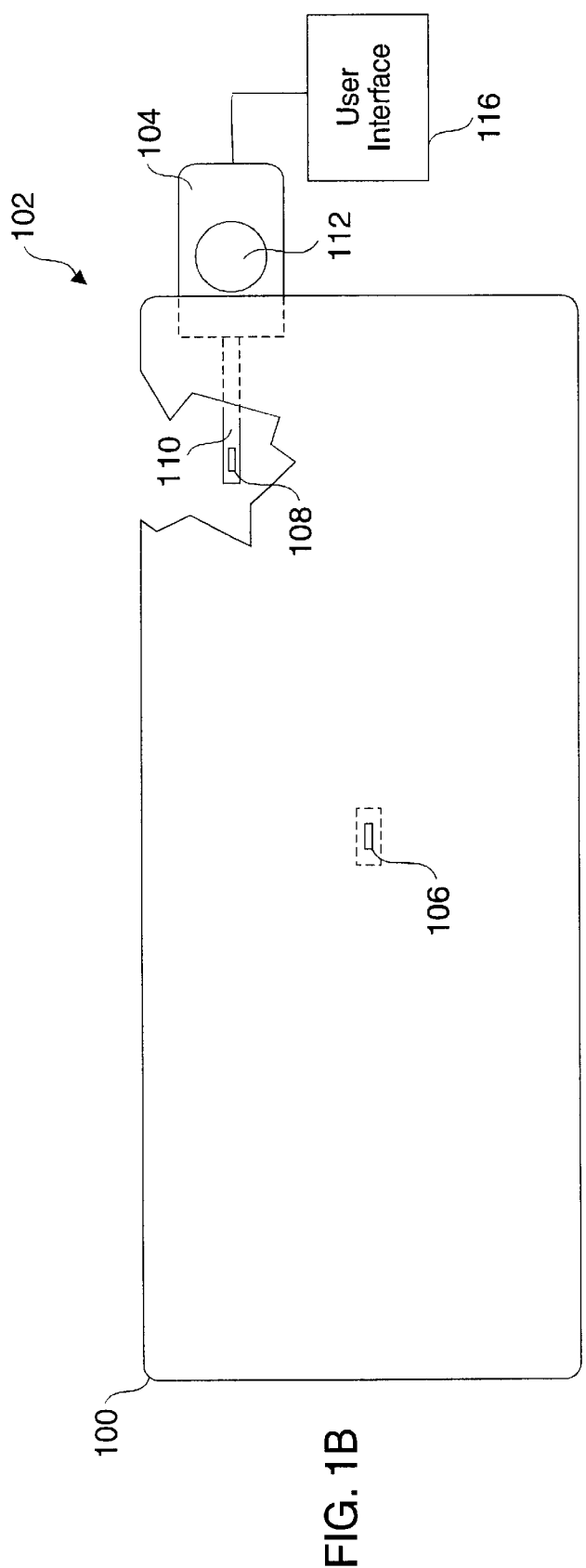
FIG. 1B is a top schematic view of one cooking apparatus that may incorporate this invention.
Figure 1C:
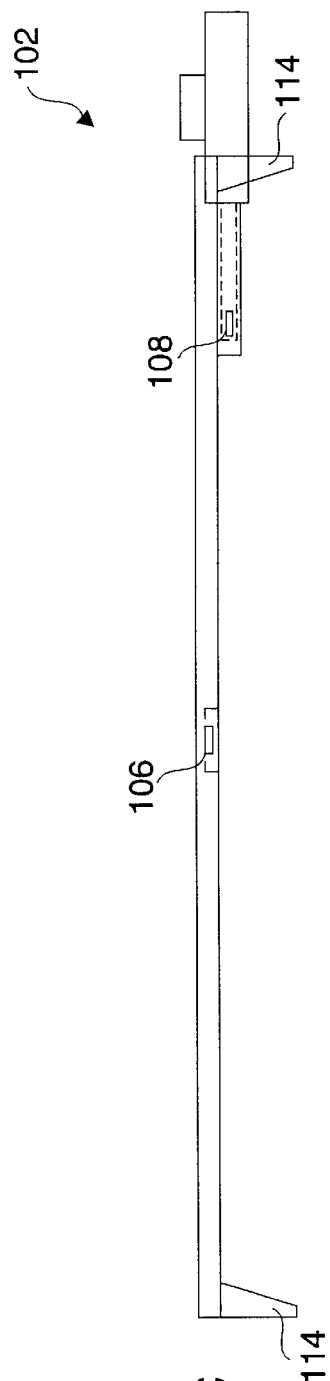
FIG. 1C is a side elevational schematic view of the cooking apparatus of FIG. 1B.

FIGS. 1B and 1C illustrate one potential cooking apparatus 100 incorporating the invention. Specifically, the cooking apparatus 100 may include a heating medium 102, a temperature control unit 104, a food temperature sensor 106 and a control temperature sensor 108. The heating medium 102 may be, for example, a griddle, a grill, an oven, a deep fryer, a rotisserie oven, or a sandwich-type dual-surface griddle. In the presently illustrated embodiment, the heating medium 102 is an aluminum griddle casting surface.

In a griddle, the temperature control unit 104 may include a temperature probe 110 via which the heating medium 102 is heated. In such an embodiment, the temperature probe 110 is connected to a power source (not shown) which provides the energy used to heat the heating medium 102. The temperature control unit 104 may also include a temperature control interface, such as a dial 112, by which a user may manually adjust the temperature set point of the heating medium 102.

The food temperature sensor 106 is physically placed in association with the heating medium 102 such that it will be in thermal relationship with a food item to be observed. In a griddle, for instance, the food temperature sensor 106 would preferably be embedded within the heating medium 102, as shown in FIGS. 1B and 1C. In a preferred embodiment, there may be visual indicia identifying the location of the food temperature sensor 106 in association with the heating medium 102 such that a user may place the food item appropriately. For example, the location of the food temperature sensor may be indicated by a raised outline or symbol, by a metal insert with a different appearance or color, an anodized coating of a different color, or a nonstick "teflon" type coating of a different color, so as to assist a user in placing the food item to be cooked in an appropriate location to better ensure thermal relationship with the food temperature sensor 106.

The control temperature sensor 108 is placed such that it will be in thermal relationship with the surrounding environment of the heating medium and not in thermal relationship with the food item itself. As explained below, the control temperature sensor 108 may be optional. In an electric griddle, the control temperature sensor 108 is preferably embedded in the probe 110 of the temperature control unit 104. Both the food temperature sensor 106 and the control temperature sensor 108 may be conventional negative temperature coefficient (NTC) thermistors such as a Fenwall ESX8206 glass encapsulated thermistors rated 470 KOhms at 25° C. Of course, other elements that sense temperature such as positive temperature coefficient (PTC) thermistors, thermocouples, resistance temperature devices (RTDs) or solid state temperature sensors may also be used.

The food temperature sensor 106 senses a plurality of temperatures of the food item (or items) over time. The control temperature sensor 108 senses a plurality of temperatures of the environment surrounding the food item over time. Thus, if the food temperature sensor 106 indicates a drop (or increase) in temperature, while the control temperature sensor 108 does not indicate a similar drop (or increase), then the drop (or increase) at the food temperature sensor 106 is likely due to a change in temperature at the food item. On the other hand, if both the food and control temperature sensors indicate a similar drop in temperature, then the temperature drop is more likely due to a temperature drop in the surrounding environment of the heating medium, as might be caused by a breeze from a person walking by the apparatus or from an open window.

Although the system of FIGS. 1B and 1C suggests the use of a single food temperature sensor 106 and a single control temperature sensor 108, in an alternative embodiment of this invention, multiple food and/or control temperature sensors 106, 108 may be used. For instance, the multiple food sensors may be arranged to sense temperatures associated with a single food item. In another example, the multiple food sensors may be arranged to sense temperatures for multiple food items (e.g., separate pancakes in a griddle). Similarly, control temperature sensors may be placed in multiple and/or alternative locations associated with the cooking apparatus 100 such as, for example, on the temperature control unit 104, or on one of the legs 114 of the heating medium 102.

With multiple food temperature sensors 106, the food temperature values sensed may, in certain embodiments, be averaged together for a more accurate reading. Similarly, with multiple control temperature sensors 108, the control temperature values sensed may be averaged together. Alternatively, the system may be designed to provide a doneness indicator with respect to each sensor 106, individually.

Figure 2:
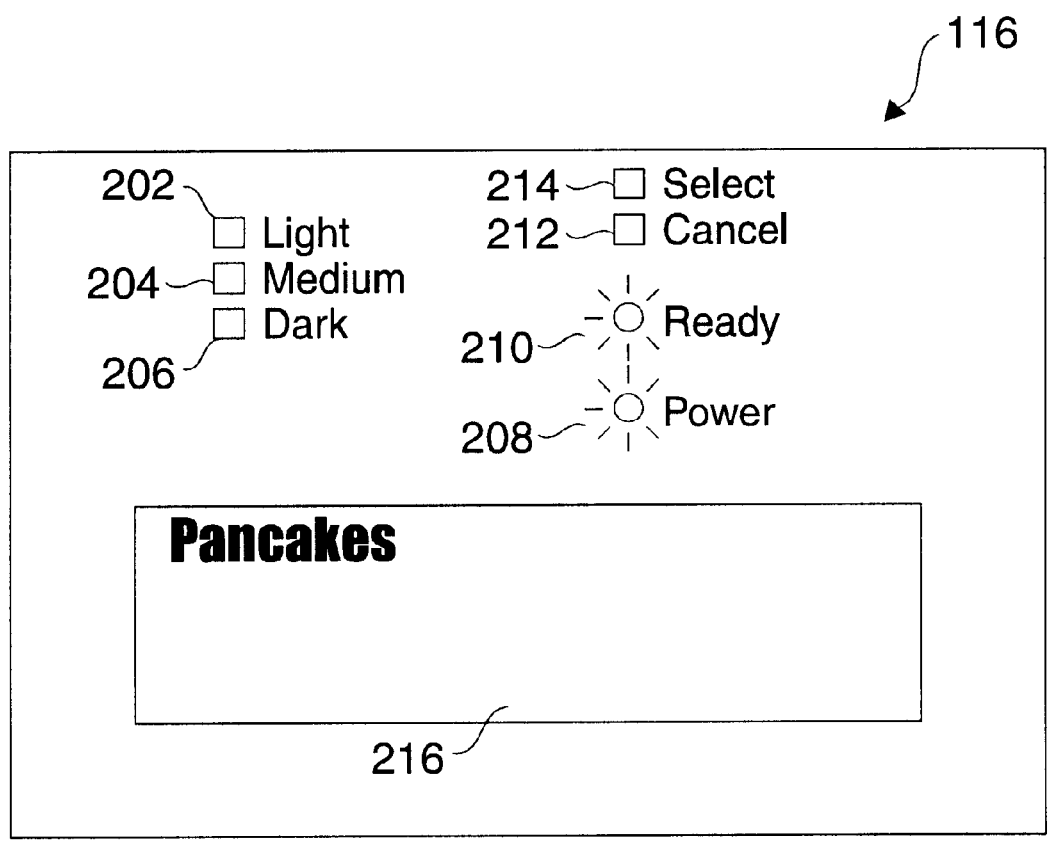
FIG. 2 illustrates one potential approach to a user interface for use with this invention in association with a cooking apparatus such as that shown in FIGS. 1B and 1C.

In one embodiment of the invention, a user interface 116 may be operably associated with the cooking apparatus 102. One such association may be accomplished via hard-wired connection to the temperature control unit 104. In another approach, the user interface 116 may be integral to the temperature control unit 104 itself. FIG. 2 illustrates one embodiment of the user interface 116 for use with the invention. As shown, the user interface 116 may include "light", "medium" and "dark" selection keys, 202–206, a power indicator light 208, a ready indicator light 210, a cancel key 212, a select key 214, and a display 216. The light, medium and dark keys 202–206 allow an end user to input the desired level of doneness of the food item (e.g., light, medium or dark) to be cooked by pressing one of the light, medium or dark keys 202–206. Various types of switches may be used to implement the keys including various momentary contact switches. It is also contemplated that a single slider switch could be used to implement a plurality of variations or settings between light and dark. Another possible approach would involve a textual or numeric interface or keyboard, where various words or numbers may be associated with corresponding light or dark settings.

When the power indicator light 208 is illuminated, this indicates that the cooking apparatus is powered-on. Similarly, when the ready indicator light 210 is illuminated, this indicates that the heating medium 102 is pre-heated or that the food item presently being cooked is ready to be flipped, or is done cooking. There may also be separate indicator lights for each of these states, each of which would be physically associated with appropriate textual legends (i.e., "pre-heated", "ready to flip", and "done cooking"). In another approach, the status of the apparatus and any food items could be displayed via a single display. In addition (or alternatively) to the ready indicator light(s) 210, the user interface 116 may include a speaker for sounding a tone when, for example, the heating medium is pre-heated, the food is ready to be flipped, and/or the food is done cooking.

The cancel key 212, as described further with respect to FIG. 4B, may be provided to allow a user to cancel a present state of the cooking apparatus such as, for example, a Cook Start State or a Cook Flip State (as described below with respect to FIG. 4B). It may also be used to clear an entry into the user interface.

In some embodiments, a select key 214 may be provided to allow a user to, for example, select the type of food to be cooked, or a cookmode, such as, for example, a manual cooking mode with fewer or no automatic food sensing features. For example, the cooking apparatus 102 may be pre-programmed to cook Eggs, French Toast, Hamburgers, Sandwiches, Pancakes, or Texas Toast. If, for example, the user desires to cook Pancakes, then the select key 214 may be pressed a number of times to scroll through the menu of known foods, until "Pancakes" appears on the display 216. Display 216 may be, for example, an LCD or CRT type display. Further, it would be possible to include the indicators (e.g., 208, 210) with this display 216.

In the embodiment of FIG. 2, the function of the keys shown in this FIG. 2 (e.g., 202–206, 212, 214) may also be accomplished by a series of menus on, for example, a LCD or interactive screen. Thus, for example, instead of the select key 214 as described above, the display may include one or more pull-down menus comprising various lists of options (e.g., type of food, desired level of doneness, temperature), which may be selected by a user via, for example, a touch-screen, a stylus-pen operated screen, a mouse device, or a set of multipurpose keys associated with the screen.

In an embodiment where, for example, a menu display option is available, if the menu of known foods is very long, the user may first choose from a shorter menu of categories of foods (e.g. "Breakfast", "Meat", "Sandwiches"). Then, once the broader category is selected, a more specific menu of foods within the category (e.g., under "Breakfast", the known foods may include Eggs, Pancakes, Texas Toast, French Toast, Sausage Patties, etc.) would appear from which the user may select the specific food item to be cooked. In an alternative embodiment, when the food is first placed on or in the heating medium, the system may detect the category of foods to which the current food item being cooked belongs (e.g., a food having eggs as a major component) from certain characteristics of the food item (e.g., mass, minimum temperatures, and/or magnitude and slope or rate of initial drop in temperature). Then, in this embodiment, to assist the user once the particular food category is determined, the user may be provided with a shorter menu having fewer food items from which to select the particular item being cooked.

Figure 3:
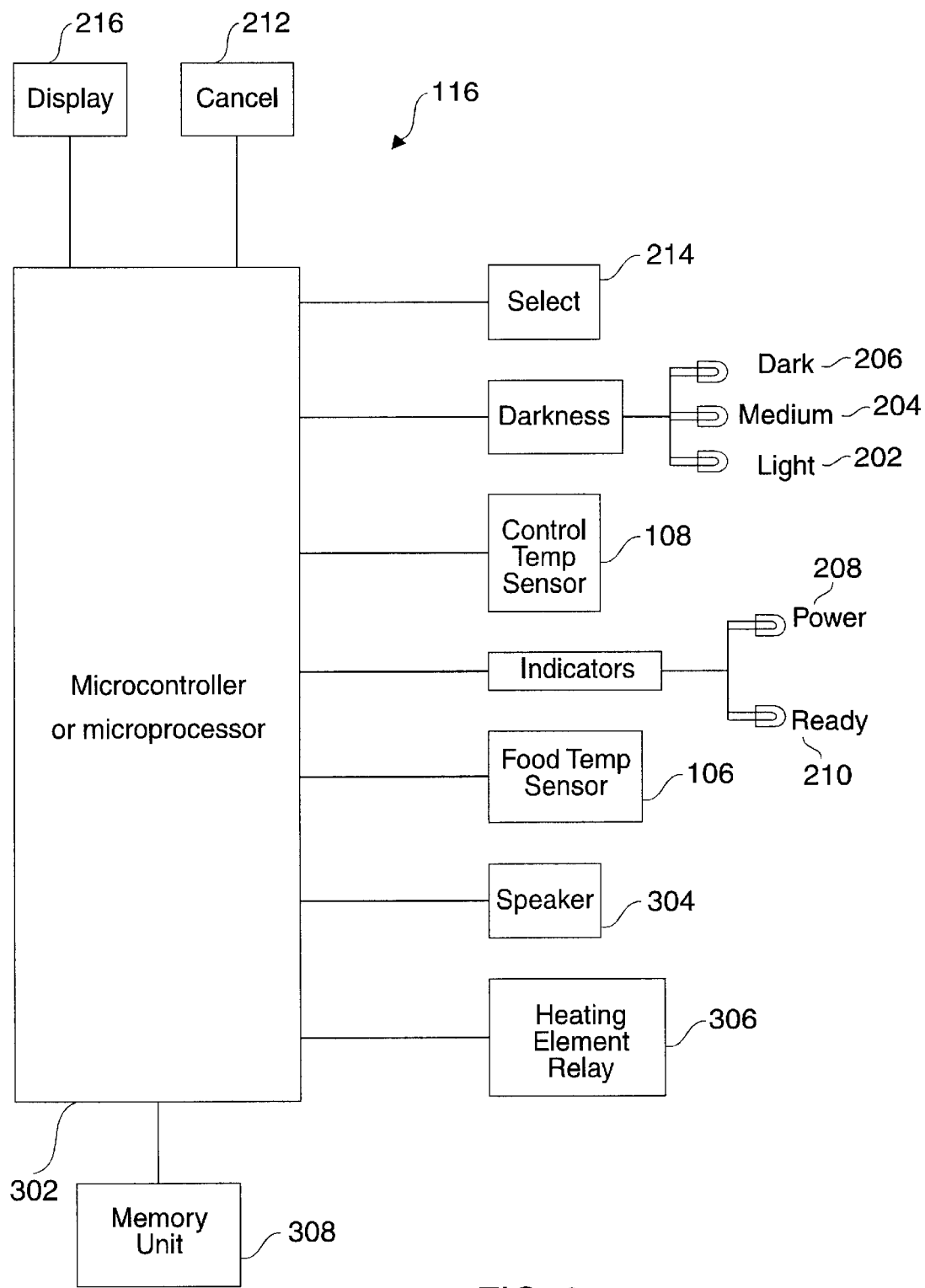
FIG. 3 is a block diagram of the electronics that may be utilized in implementing one approach to this invention for use in association with a cooking apparatus, such as that shown in FIGS. 1B and 1C, and user interface of FIG. 2.

FIG. 3 illustrates an electronic block diagram of the electronics that may be used to implement this inventive system. As shown, the electronics may include a microprocessor 302 which interfaces with and controls the various components of the system, including the user interface 116, the control temperature sensor 108, the food temperature sensor 106, the speaker 304, a heating element relay 306, and a memory unit 308.

Microprocessor 302 may be a conventional microprocessor such as a Microchip PIC 16C73A microprocessor. As explained further below, the microprocessor 302 may be used to accomplish various functions to determine the status of a food item, including, but not limited to, performing simple arithmetic functions, including incrementing counters and/or indices, calculating delta values, or performing various value comparisons. While a microprocessor is the preferred means for performing the various functions to determine the status of the food item, other means may be used as well. For example, one of skill in the art would understand that an arithmetic logic unit (ALU), or an application-specific integrated circuit (ASIC) may be used to perform the desired calculations. Similarly, a hard-wired digital circuit or analog circuit may be used as well to perform the calculations. With respect to the methods described below, the microprocessor will be more generally referred to as a "controller."

The various indicator lights (208, 210) may be standard high efficiency light-emitting diodes ("LEDs"). The heating element relay 306 may be a conventional SPST DC coil relay such as an Aromat JS1A24 or a solid state switch such as a Triac.

Figure 4A:
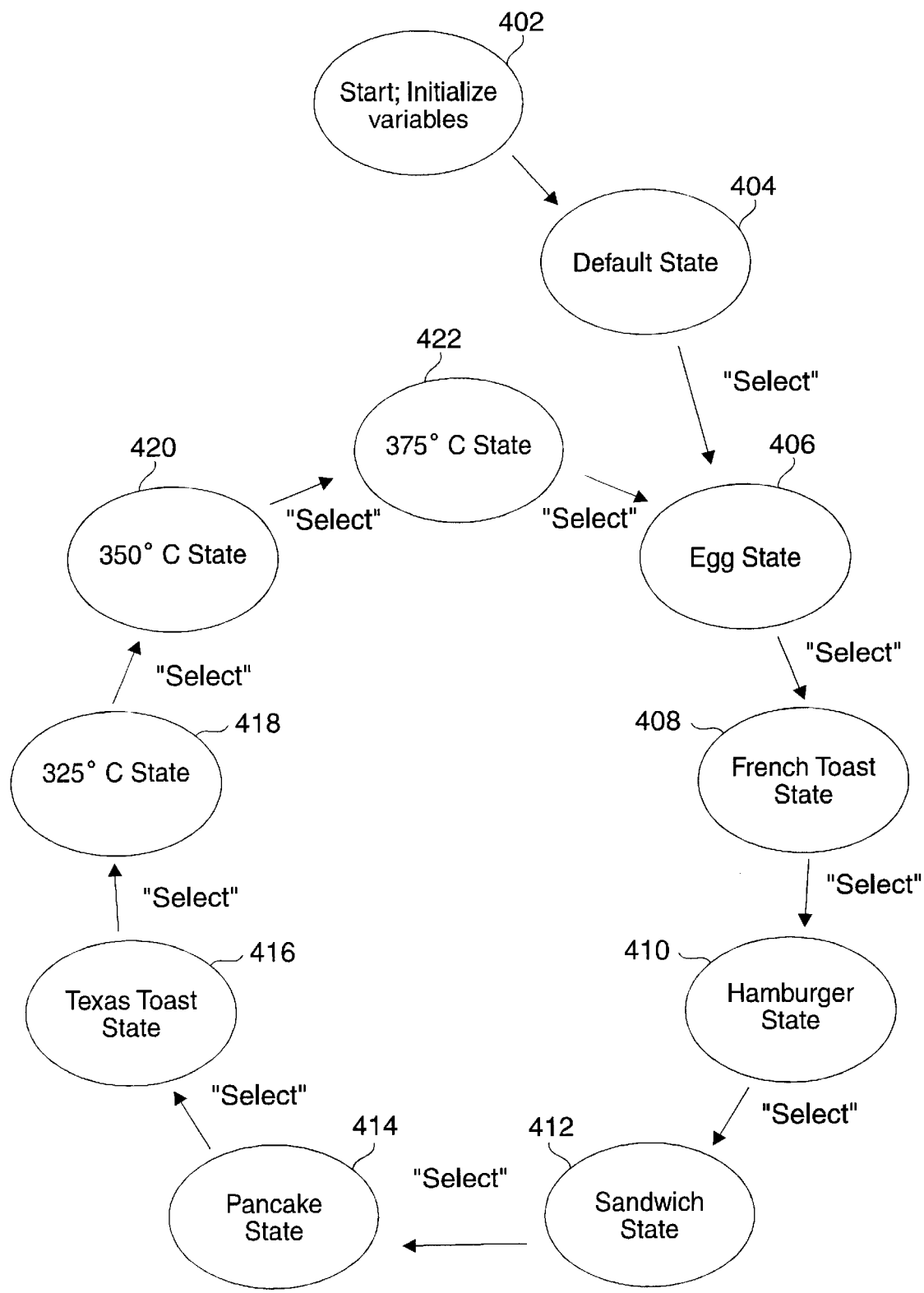
FIG. 4A is an example of a main state-variable diagram generally illustrating the various cooking states achieved in accordance with one embodiment of the invention.

FIG. 4A illustrates an example of a main state-variable diagram generally identifying the various cooking states achieved in accordance with an embodiment of the invention. In this example state diagram, there are illustrated ten (10) example states as set forth in Table 1 below.

TABLE 1

| STATE | display | food sensing | delta setpoint | time (sec): min/med/dark |
|---|---|---|---|---|
| Start State (402) [initialize variables] | "Smart Grille" and/or "Press a Key" | Disabled | N/A | N/A |
| Default State (404) | "Smart Grille" and/or "Press a Key" | Disabled | N/A | N/A |
| Egg State (406) | "Eggs" | Enabled | 7 | 95/110/130 |
| French Toast State (408) | "French Toast" | Enabled | 7 | 130/145/175 |
| Hamburger State (410) | "Hamburger" | Enabled | 7 | 360/400/580 |
| Sandwich State (412) | "Sandwiches" | Enabled | 7 | 105/145/175 |
| Pancake State (414) | "Pancakes" | Enabled | 7 | 105/120/150 |
| Texas Toast State (416) | "Texas Toast" | Enabled | 7 | 130/175/200 |
| 325° C. State (418) | "Other Foods - 325° C." | Disabled | N/A | N/A |
| 350° C. State (420) | "Other Foods - 350° C." | Disabled | N/A | N/A |
| 375° C. State (422) | "Other Foods - 375° C." | Disabled | N/A | N/A |

While in the "start" state 402, all cooking state-variables are initialized. Each state-variable is associated with a different state. For example, the Egg State 406 may have an egg_state variable such that if egg_state=1, the cooking apparatus is in the Egg State (i.e., in a state to cook an egg) and if egg_state=0 the cooking apparatus is not in the Egg State. In each state, the present cooking method and apparatus may have various predetermined settings. For example, in the Egg State (e.g., when egg_state=1), the display may read "Eggs", the delta setpoint (as described in detail below) may be equal to 7, and the cooking time for each side may be set to 95 sec., 110 sec., or 130 sec. (for light, medium or dark selections, respectively). Also as illustrated in FIG. 4A, a user may press the "select" button in order to toggle between the different states.

In addition to various "food specific" states (e.g., Egg State, French Toast State, Hamburger State, etc.), the present cooking method and apparatus may have "temperature specific" states (e.g., 350° C. State, 375° C. State). In such temperature specific states, the user may desire to cook a food at a specific temperature without using the sensing feature of the cooking apparatus. In such a case, the user may select, for example, 350° C. at which to cook a particular food. In such a "350° C. State", the 350° C._state variable may be equal to 1 when this state is selected, and 0 when this state is not selected. In this example, in the 350° C. State, the display may read "Other Foods –350° C.", and the food sensing function is disabled.

Figure 4B:
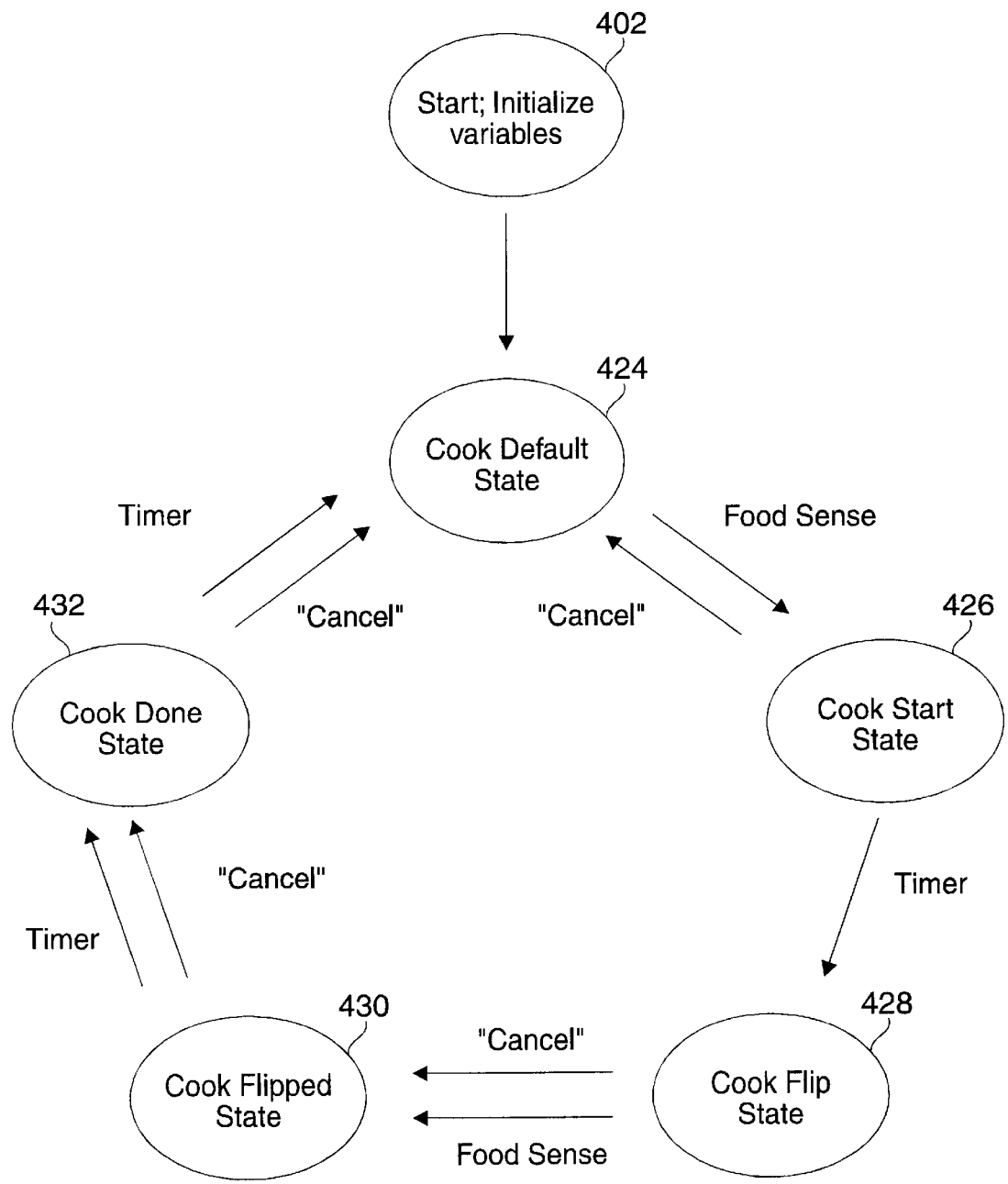
FIG. 4B is an example of a cookmode state diagram generally illustrating the various cookmode states achieved in accordance with one embodiment of the invention.

FIG. 4B illustrates an example of a cookmode state diagram generally identifying the various cookmode states achieved in accordance with an embodiment of the invention. In this example cookmode state diagram, there are illustrated five (5) example states as set forth in Table 2a below.

TABLE 2a

| STATE | DESCRIPTION | |
|---|---|---|
| | display | Food sensing/cooking |
| Cook Default State (424) | current food (based on cooking-state-variable of FIG. 4A) | set delta setpoint to 7. |
| Cook Start State (426) | "Cooking" and progress bar | Initiate timer (based on cooking state-variable and based on auto-shutoff) |
| Cook Flip State (428) | "Flip Now" and erase progress bar | set delta setpoint to 3 |
| Cook Flipped State (430) | "Cooking" and progress bar | initiate timer (based on main state-variable and based on auto-shutoff) |
| Cook Done State (432) | "Done" and erase progress bar | initiate timer to return to Cook Default State and based on auto-shutoff |

As explained with respect to FIG. 4A, while in the "start" state 402, all cookmode variables are initialized. Each cookmode state is associated with one or more different cookmode variables. For example, the Cook Flip State (428) may have a cookflip_state variable where cookflip_state=1 means that the food item being cooked is ready to be flipped, and cookflip_state=0 means that the food item being cooked is not ready to be flipped. An example of the values for other potential cookmode variables associated with the cookmode states of FIG. 4B is illustrated in Table 2b below.

TABLE 2b

| Cook Default State (424) | cookdefault_state = 1 (in default mode) |
| | cookdefault_state = 0 (not in default mode) |
| Cook Start State (426) | cookstart_state = 1 (in cook start mode—timed cooking) |
| | cookstart_state = 0 (not in cook start mode) |

TABLE 2b-continued

| Cook Flip State (428) | cookflip_state = 1 (in cook flip mode—ready to flip) |
| | cookflip_state = 0 (not in cook flip mode) |
| Cook Flipped State (430) | cookflipped_state = 1 (in cook flipped mode—food flipped; timed cooking) |
| | cookflipped_state = 0 (not in cook flipped mode) |
| Cook Done State (432) | cookdone_state = 1 (in cook done mode—food done) |
| | cookdone_state = 0 (not in cook done mode—food not done) |

In each cookmode state, the present cooking method and apparatus would have various predetermined settings. For example, when cookflip_state=1, the display may read "Flip Now" indicating that the food is ready to be flipped, and the delta setpoint (described below) may be set to 3.

Also as illustrated in FIG. 4B, a user may press the "cancel" button while the apparatus is in various cookmode states. For example, the user may press "cancel" while the apparatus is in the Cook Flip State 428 (i.e., cookflip_state=1) in order to bypass flipping of the food. Similarly, the user may press "cancel" while the apparatus is in the Cook Start State 426 if the user wants to cancel cooking altogether. Pressing the "cancel" button during any of the cookmode states generally resets the particular cookmode variable in progress to zero.

Figure 5:
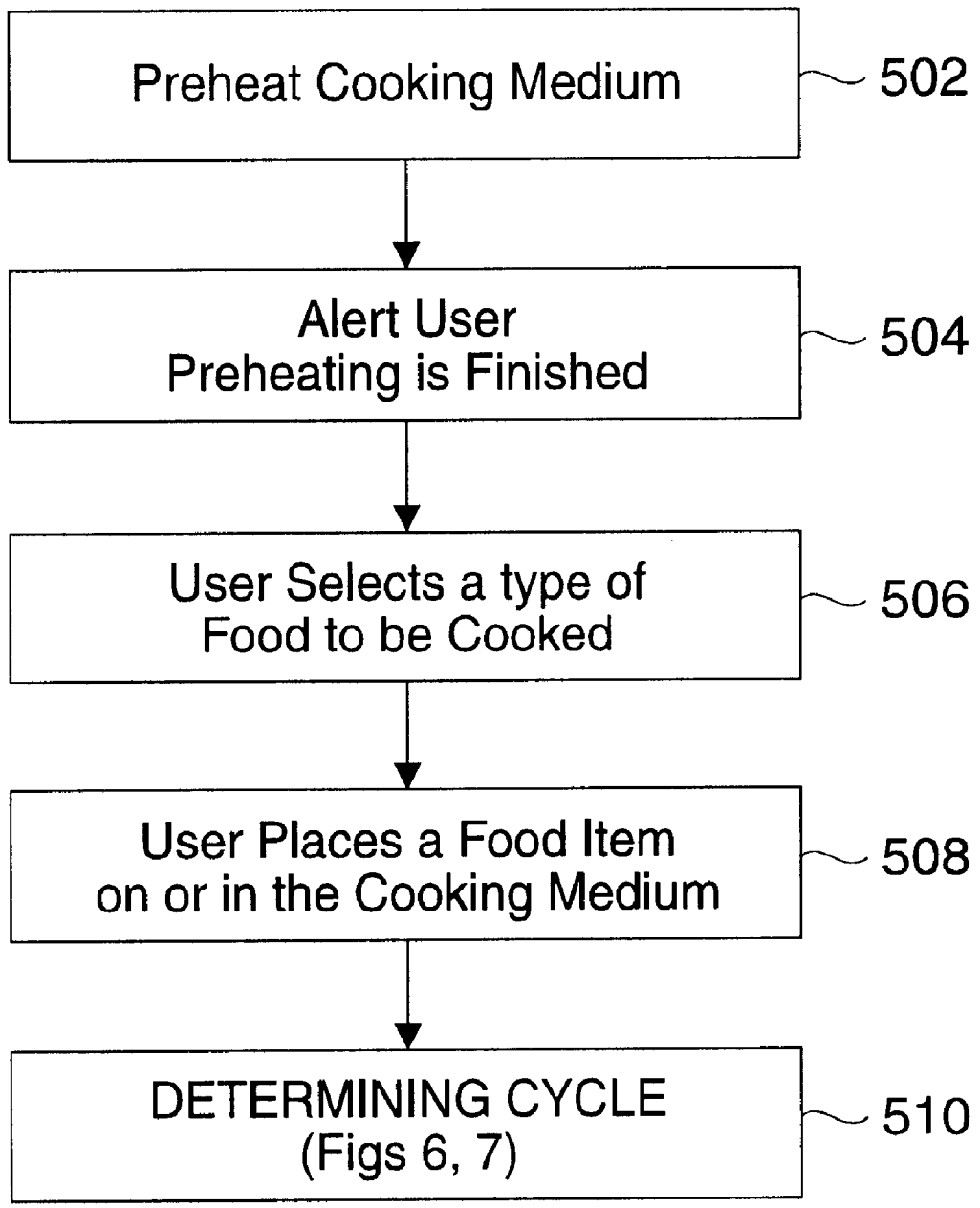
FIG. 5 is a flow chart illustrating a method for determining the status of a food item during a cooking event in accordance with this invention.

FIG. 5 is a flow chart illustrating a possible method for determining the status of a food item during a cooking event in accordance with the present invention. A "cooking event" is the complete cooking or heating of a food item in accordance with the invention. A "timing period" is a period either during which timed cooking or heating is occurring, or during which a predetermined temperature is being achieved (e.g., pre-heating). Timed cooking may be based on a predetermined period of time, or may vary depending on the minimum or maximum delta value set by the microprocessor 302. For example, a larger food item having greater mass tends to have a steeper negative temperature slope than a smaller food item (i.e., the temperature decreases more quickly when the food item is placed on or in the heating medium). Thus, the "predetermined" cooking time in those situations may vary so that if a larger food item is detected, the cooking time may be automatically increased by the microprocessor 302. This would tend to compensate for differences in, for example, the mass of the food items. A "cooking cycle" is an entire cycle of sensing, timed cooking, and alerting the user (e.g., sensing a food item has been added to the heating medium, timed cooking on the first side of the food item, and alerting the user that the food item is ready to be flipped). After the cooking apparatus 100 is turned on, the heating medium preheats (step 502). In certain embodiments, this pre-heating step may occur upon the actuation of a key or button. Alternatively, the pre-heating step 506 may occur when the apparatus 100 is plugged into a power outlet and/or turned on.

After the heating medium is pre-heated, step 502, the controller drives a ready signal (e.g., a "status signal" 105, as described in FIG. 1A) to the ready indicator light 210 and/or the speaker 304, wherein the light 210 illuminates and/or the speaker 304 sounds a tone, alerting the user that the cooking apparatus 100 is preheated, step 504.

Next, the user may input data into the apparatus (step 506) via, for example, the user interface 116. For example, if the user desires to cook pancakes that are very well done, the user would enter "Pancakes" via the select key and select the "dark" key 206 (as opposed to light key 202 or medium key 204).

In certain embodiments, no user data is entered at all. This may occur, for example, where the apparatus is designed especially for cooking one particular type of food (e.g., a waffle iron). With such an embodiment, there is no need to input a type of food to be cooked because the type of food (e.g., a waffle) is assumed. As another example where no user data is entered at all, the apparatus may be designed only for sensing doneness, such as an electronic turkey timer. In such an embodiment, there is no need for a user to input any data.

Generally, after the user selects the type of food to be cooked 506, the food item is placed in operable association with the heating medium, step 508, and then the determining cycle occurs (step 510). During the determining cycle, as described in detail with respect to FIGS. 6 and 7, the microprocessor periodically senses and compares temperatures until the food item is ready to be flipped or is done (see FIGS. 6 and 7). Depending upon the food item and/or heating medium, there may be only one determination (e.g., where the food is not flipped at all) per cooking event, or there may be more than one determining cycle (e.g., the food is flipped one or more times, and/or there is more than one side of a food item to be cooked) per cooking event.

In general, a record of temperatures measured at the food sensor(s), and optionally at the control sensor(s), is kept in an array of locations in the memory unit (referred to as a "temperature array" and more specifically, as a "food temperature array" and a "control temperature array," respectively). Each temperature array has at least $N_{MAX}$ memory locations. Based on the inventor's research, $N_{MAX}$ has been set equal to 7 in a preferred embodiment. Also in this preferred embodiment, one new temperature is sensed and then stored in this temperature array every period. In a preferred embodiment, a period is equal to one second. However, the period may differ in different embodiments. Further, although other methods may be used, in a preferred embodiment, the temperatures (referred to collectively as temperature data) are stored in first-in first-out ("FIFO") order. Thus, the oldest temperature data in the temperature array is discarded, every other temperature data is moved up in the order by one position, and the newest data is inserted at the first position in the temperature array.

Figure 6:
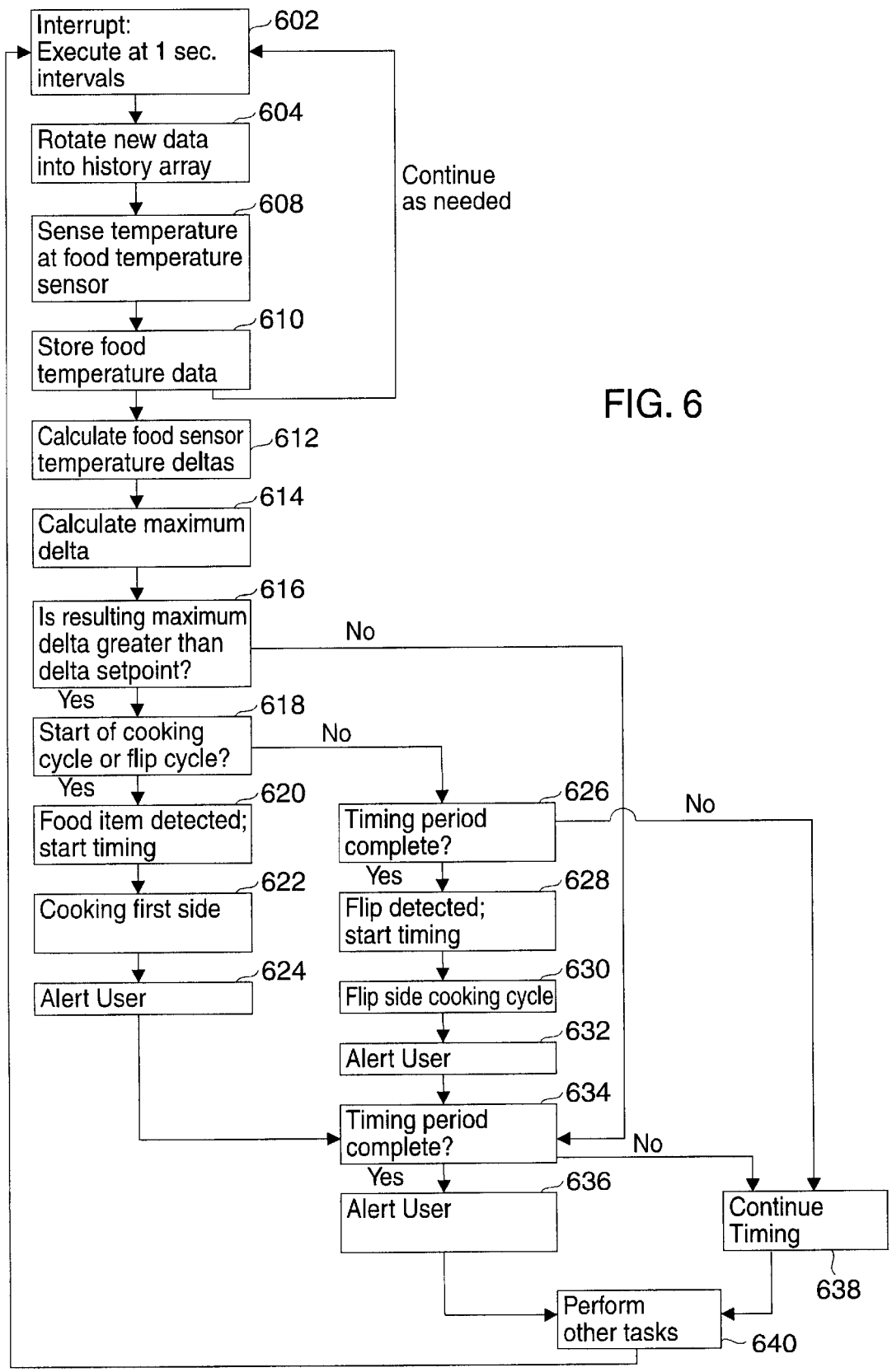
FIG. 6 is a flow chart illustrating one potential approach to the determining cycle of FIG. 5.

FIG. 6 is a flow chart illustrating one potential approach to the determining cycle (i.e., step 510) of FIG. 5, for use in an embodiment where a control temperature sensor is not provided and/or used. Although this determining cycle appears in FIG. 5 to only occur once (e.g., after the food item to be cooked is placed on (or in) the cooking medium), the determining cycle is preferably continually occurring in the background while the cooking apparatus is powered on. However, it is after the food item is placed on or in the heating medium or flipped when a complete determining cycle occurs.

During the determining cycle, an interrupt occurs every period (preferably 1 second), step 602. During the interrupt, the food temperature data in a food temperature array shifts in FIFO order so that the oldest food temperature is discarded leaving room for a new food temperature to be stored in the food temperature array, step 604. Accordingly, the food temperature stored at memory location J of the food temperature array would be shifted to food memory location J+1, and the food memory location J=0 would be cleared. Then, a new food temperature is sensed, step 608, and stored in food memory location J=0, step 610.

Next, the microcontroller 302 may perform a series of calculations to determine the current status of the food item. The controller calculates one or more "food delta values" based on the currently stored food temperature data, step 612. A delta value is generally a value indicating a change in temperature between two temperatures. Thus, a food delta value specifically is a change in temperature between two food temperatures. In a preferred approach, a food delta value may be calculated by taking the current food temperature (i.e., the food temperature most recently sensed, which is stored in memory location J=0) and subtracting from that temperature the value of each other sensed food temperature stored in the food temperature array. This approach is illustrated in Table 3 below. Optionally, the controller may divide these food delta values by the appropriate time difference to obtain conventional slope values.

Table 3 shows a sample temperature array where $T_N$ refers to the temperature stored in the Nth location of the temperature array. In the temperature array shown in Table 3, a food item (e.g., an egg) is placed on the pre-heated heating medium:

TABLE 3

| | |
|---|---|
| $T_0$ | 145° |
| $T_1$ | 100° |
| $T_2$ | 90° |
| $T_3$ | 86° |
| $T_4$ | 85.3° |
| $T_5$ | 84.9° |
| $T_6$ | 84.7° |

Based on the example sensed food temperatures of Table 3, the food delta values calculated from this data would be as follows:

TABLE 4

| | |
|---|---|
| $M_{6-0}$ | 60.3° C. |
| $M_{6-1}$ | 15.3° C. |
| $M_{6-2}$ | 5.3° C. |
| $M_{6-3}$ | 1.3° C. |
| $M_{6-4}$ | 0.6° C. |
| $M_{6-5}$ | 0.2° C. |

The maximum calculated food delta value may then be compared to predetermined delta data (referred to as delta setpoints) to determine the status of the food item (e.g., whether a food item has been introduced to the heating medium or flipped), steps 614–616. In a preferred embodiment, the delta setpoints are 7° C. to determine when the food has originally been placed on the heating medium (the "start-cook setpoint"), and 3° C. to determine when the food is flipped (the "flip setpoint").

If the maximum food delta value is greater than some delta setpoint as described above, step 616, then the microprocessor 302 determines whether the current cookmode state of the apparatus is, for example, either Cook Start State or Cook Flipped State, 618. If the maximum food delta value is greater than the start-cook setpoint, this indicates that the food item has been placed on or in the pre-heated heating medium, and thus the apparatus enters the Cook Start State (i.e., cookstart-state=1). In this case, this is the start of a new timing period, and thus the timer is reset and begins timing, step 620, whereupon timed cooking proceeds 622. Similarly, if the maximum delta value is between the cook-start setpoint and the flip setpoint, this indicates that the food item has been flipped, and thus the apparatus should enter the Cook Flipped State (i.e., cookflipped-state=1). In this case, this is the start of the next, or "flipped" timing period, and the timer is reset and begins timing, step 628, whereupon timed cooking of the second side proceeds, 630.

As explained above, timed cooking may be based on a predetermined period of time, or may vary depending on the minimum or maximum delta value determined by the processor. For example, a larger food item having greater mass tends to have a steeper negative temperature slope than a smaller food item (i.e., the temperature decreases more quickly when the item is placed on or in the heating medium). Thus, the "predetermined" cooking time in the situation may vary so that if a larger food item is detected, the cooking time may be automatically increased by the microprocessor 302. This would tend to compensate for differences in, for example, the mass of the food items. In an alternative embodiment, rather than timed cooking (i.e., cooking for a predetermined period of time), heating of the food item may be controlled based on an absolute food temperature. After timed cooking is complete, a light illuminates and/or the speaker sounds a tone 624, alerting the user of the occurrence of an event (e.g., first side is done, or second side is done).

Next, the microprocessor determines if a timing period is complete 634. If a timing period is not complete then timed cooking continues 638, and any other background tasks (e.g., temperature control, user interface functions, etc.) continue 640. If a timing period is completed, 634, then a light illuminates and/or the speaker sounds a tone 636, alerting the user as such, and other background tasks continue, step 640.

If, after the microprocessor determines that the maximum food delta value is greater than a delta setpoint (e.g., the start-cook or flip setpoints), step 616, it is determined that the current cookmode of the apparatus is neither Cook Start State nor Cook Flipped State, step 618, then the microprocessor determines whether the timing period for the first side of the food item ("first side timing period") is complete, step 626. If the first side timing period is not complete, then timed cooking continues, step 638, and other background tasks continue, step 640. If the first side timing period is complete, then the apparatus goes into the Cook Flip Mode, and the timing period for the second side of the food item ("flip side timing period") begins, step 630. The user may then be alerted that the cooking of the second side has begun. At the end of this new flip side timing period, a light illuminates and/or the speaker sounds a tone, step 636, alerting the user that the current timed cooking is complete, and other background tasks continue, step 640.

If, the maximum food delta value is not greater than any of the delta setpoints (step 616), the microprocessor determines if a timing period is complete 634. If a timing period is not complete then timed cooking continues 638, and other background tasks described herein continue 640. If a timing period is completed, then a light illuminates and/or the speaker sounds a tone, step 636, alerting the user as such, and other background tasks continue, step 640.

Figure 7:
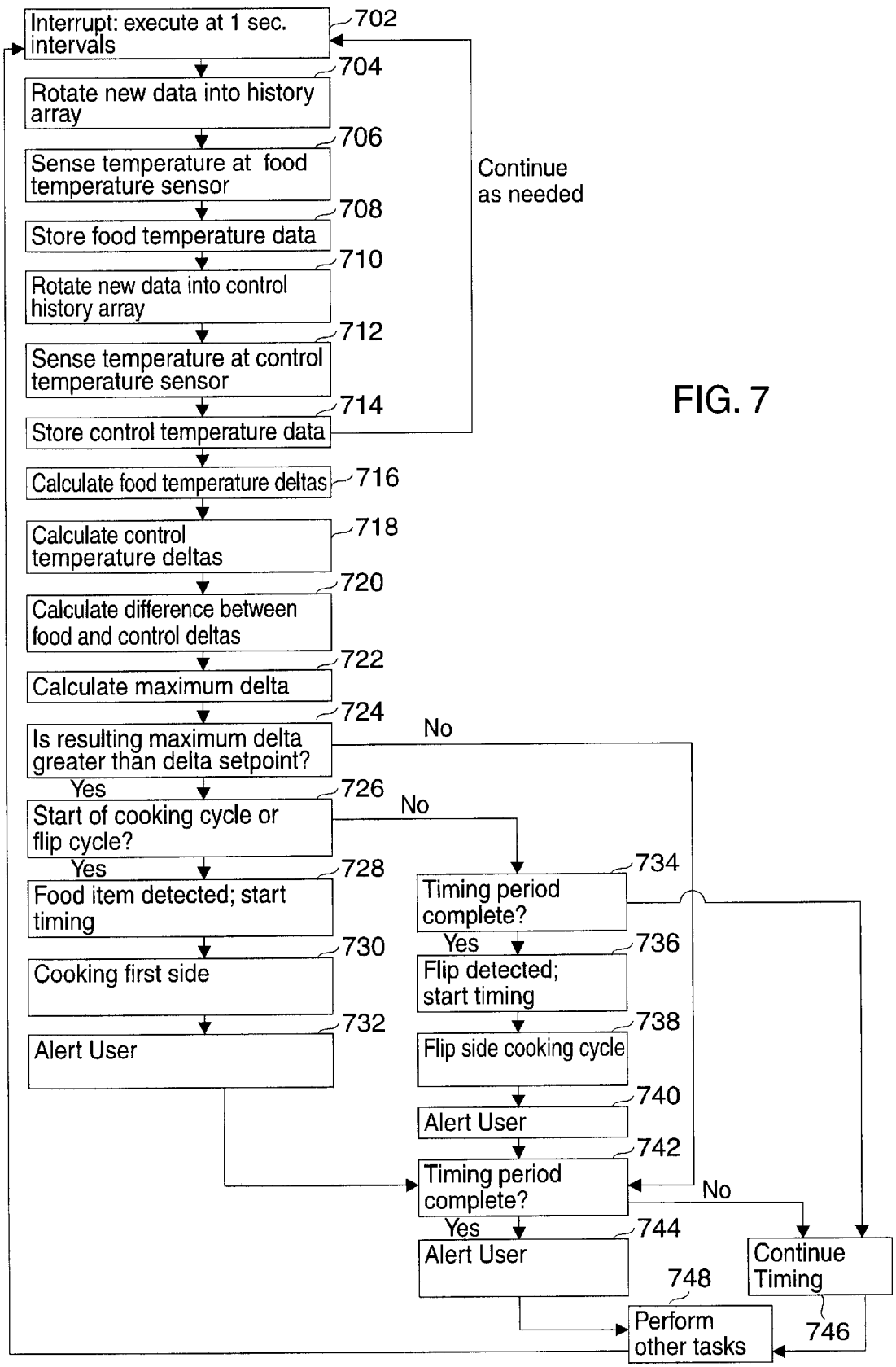
FIG. 7 is a flow chart illustrating another potential approach to the determining cycle of FIG. 5.

FIG. 7 illustrates another potential approach for a modified determining cycle (i.e., steps 510) of FIG. 5, for use in an embodiment where a control temperature sensor is provided in addition to a food temperature sensor. As explained above, although the determining cycle appears in FIG. 5 to only occur once (e.g., after the food item to be cooked is placed on (or in) the cooking medium), the determining cycle is preferably continually occurring in the background while the cooking apparatus is powered on.

However, it is after the food item is placed on or in the heating medium when a complete determining cycle occurs.

During the modified determining cycle, an interrupt occurs every period (preferably equal to 1 second), step 702. During the interrupt, the food temperature data in the food temperature array shifts in FIFO order so that the oldest food temperature is discarded leaving room for the newly sensed food temperature to be stored in the food temperature array, step 704. Accordingly, the food temperature stored at food memory location J is shifted to food memory location J+1, and the food memory location J=0 is cleared. Then, a new food temperature is sensed, step 706, and stored in food memory location J=0, step 708.

The modified determining cycle of FIG. 7 also utilizes control temperature data which is sensed by the control temperature sensor and stored in a control temperature array. Thus, during each interrupt, the control temperature data in the control temperature array shifts in FIFO order so that the oldest control temperature is discarded leaving room for a newly sensed control temperature to be stored in the control temperature array, step 710. Accordingly, the control temperature stored at control memory location K is shifted to control memory location K+1, and the control memory location K=0 is cleared. Then, a new control temperature is sensed, step 712, and stored in control memory location K=0, step 714.

The microcontroller 302 may then perform a series of calculations to determine the current status of the food item. The microcontroller 302 calculates one or more food delta values (as discussed with respect to FIG. 6) based on the currently stored food temperature data, step 716. Similarly, the microcontroller 302 calculates one or more control delta values based on the currently stored control temperature data, step 716. (As explained with respect to FIG. 6, a delta value is a value indicating a change in temperature between two temperatures.) Thus, a control delta value specifically is a change in temperature between two control temperatures. In a preferred approach, the control delta values may be calculated by taking the current control temperature (i.e., the control temperature most recently sensed, which is stored in memory location K=0) and subtracting from that temperature the value of each other sensed control temperature stored in the control temperature array. Optionally, the controller may divide these control delta values by the appropriate time difference to obtain conventional slope values. When the control delta values and food delta values are calculated, normalized delta values may be determined be subtracting each control delta value from a respective food delta value, step 720. An example of the foregoing is illustrated in Tables 5 and 6 below.

TABLE 5

|  | Food | Control |
|---|---|---|
| $T_0$ | 97.3° | 80.1° |
| $T_1$ | 97.5° | 80.3° |
| $T_2$ | 98° | 80.2° |
| $T_3$ | 98.5° | 80.2° |
| $T_4$ | 93.7° | 74.9° |
| $T_5$ | 99.5° | 80.1° |
| $T_6$ | 100° | 80.2° |

Based on the example sensed temperatures of Table 5, the food delta values, control delta values and normalized delta values calculated from this data would be as follows:

TABLE 7

|  | Food Delta Values | Control Delta Values | Normalized (food-control) |
| --- | --- | --- | --- |
| $M_{6-0}$ | 2.7° C. | 0.1° C. | 2.6° C. |
| $M_{6-1}$ | 2.5° C. | -0.1° C. | 2.6° C. |
| $M_{6-2}$ | 2.0° C. | 0° C. | 2.0° C. |
| $M_{6-3}$ | 1.5° C. | 0° C. | 1.5° C. |
| $M_{6-4}$ | 6.3° C. | 5.3° C. | 1.0° C. |
| $M_{6-5}$ | 0.5° C. | 0.1° C. | 0.4° C. |

After the normalized delta values are determined, 720, the maximum calculated normalized delta value may then be compared to predetermined delta data (e.g., the delta setpoints) to determine the status of the food item (e.g., whether a food item has been introduced to the heating medium or flipped) or a stage of doneness of the food item, steps 722–724. As explained, in a preferred embodiment, the start-cook setpoint is 7° C., and the flip setpoint is 3° C.

If the maximum normalized delta value is greater than a delta setpoint as described above, step 724, then the microprocessor determines whether the current cookmode state of the apparatus is, for example, either Cook Start State or Cook Flipped State, step 726. If the maximum normalized delta value is greater than the start-cook setpoint, this indicates that the food item has been placed on or in the pre-heated heating medium, and thus the apparatus enters the Cook Start State. In this case, this is the start of a new timing period, and thus the timer is reset and begins timing, step 728, whereupon timed cooking proceeds, 730. Similarly, if the maximum normalized delta value is between the cook-start setpoint and the flip setpoint, this indicates that the food item has been flipped, and thus the apparatus enters the Cook Flipped State. In this case, this is the start of the next or "flipped" timing period, and the timer is reset and begins timing, step 736, whereupon timed cooking of the second side proceeds, 738.

As explained above, timed cooking may be based on a predetermined period of time, or may vary depending on the minimum or maximum delta value determined by the processor. For example, a larger food item having greater mass tends to have a steeper negative temperature slope than a smaller food item (i.e., the temperature decreases more quickly when the item is place on or in the heating medium). Thus, the "predetermined" cooking time in the situation may vary so that if a larger food item is detected, the cooking time may be correspondingly increased. This adjustment would tend to compensate for differences in, for example, the mass of the food items. In an alternative embodiment, rather than timed cooking (i.e., cooking for a predetermined period of time), heating of the food item may be controlled based on an absolute food temperature. After timed cooking is complete, a light illuminates and/or the speaker sounds a tone, step 732, alerting the user of the occurrence of an event (e.g., first side is done, or second side is done).

Next, the microprocessor determines if a timing period is complete, step 742. If a timing period is not complete then timed cooking continues, step 746, and other background tasks continue, step 748. If a timing period is completed, step 742, then a light illuminates and/or the speaker sounds a tone, step 744, alerting the user as such, and other background tasks continue, step 748.

If after the microprocessor determines that the maximum normalized delta value is greater than a delta setpoint, step 724, it is determined that the current cookmode of the apparatus is neither Cook Start State nor Cook Flipped State, step 726, then the microprocessor determines whether the timing period for the first side of the food item ("first side timing period") is complete, step 734. If the first side timing period is not complete, then timed cooking continues, step 746, and other background tasks continue. step 748. If the first side timing period is complete, then the apparatus goes into the Cook Flip Mode, and the timing period for the second side of the food item ("flip side timing period") begins, step 738. The user is then alerted that the cooking of the second side has begun. At the end of this new flip side timing period, a light illuminates and/or the speaker sounds a tone, step 744, alerting the user that the current timed cooking is complete, and other background tasks continue, step 748.

If, the maximum normalized delta value is not greater than any of the delta setpoints (step 724), the microprocessor determines if a timing period is complete, step 742. If a timing period is not complete then timed cooking continues, step 746, and other background tasks described herein continue, step 748. If a timing period is completed, then a light illuminates and/or the speaker sounds a tone, step 744, alerting the user as such, and other background tasks continue, step 748.

In the example shown in Tables 5 and 6, according to the method illustrated by FIG. 6, the system would indicate that the food item has been flipped (since the maximum food delta value is 6.3° C. which is greater than the flip setpoint, 3° C.), thus triggering a new flip side timing period. However, as explained below, in accordance with the method illustrated by FIG. 7, the food delta values would be modified by subtracting the control delta values from the food delta values to calculate normalized delta values. The control delta values act as a control variable to account for possible environmental anomalies in the temperature measurements and delta value calculations. Then, in this approach, the normalized delta values (rather than the actual food delta values) are compared with the delta setpoints, step 716.

Thus, as in the example of Tables 5 and 6, it appears that a substantial dip in temperature (i.e., $T_4$) occurred, perhaps due to a breeze from an open window or some other drop in room temperature. Thus, by modifying the food delta values to determine normalized food delta values, step 714, the method of FIG. 7 better avoids false triggering of a new timing period. Thus, the timing period will only begin when the food temperature sensor experiences a steep drop in temperature, but the control temperature sensor does not.

Figure 8:
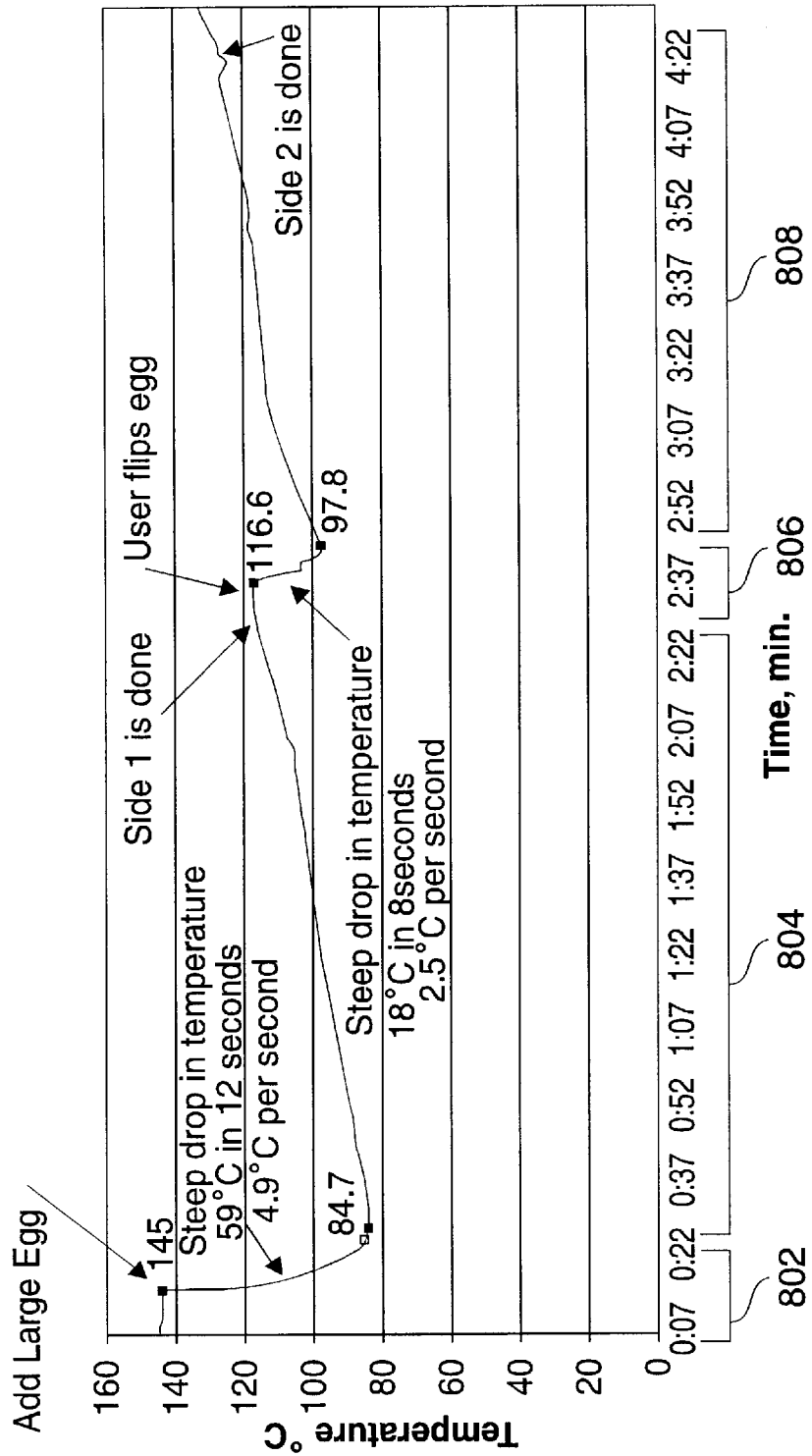
FIG. 8 illustrates a time-temperature curve of the cooking of an egg on the cooking apparatus illustrated in FIGS. 1B and 1C.

An example showing the status or stage of doneness of a particular food item at different periods of time is illustrated in FIG. 8, which shows a time-temperature profile produced by cooking one large egg on a particular heating surface. Using this easily obtained data, the time-temperature profiles illustrate the status of the food item including introducing a food item to the heating medium 802, cooking the first side of the food item for a predetermined period of time 804, flipping the food item 806, and cooking the second side of the food item for a predetermined period of time 808. Thus, by conducting simple experiments for any cooking event for each desired type of food, a database of time-temperature data may be created and stored within the memory unit 308. As would be understood, memory unit 308 may be discrete or integral to microcontroller 302.

Figure 9:
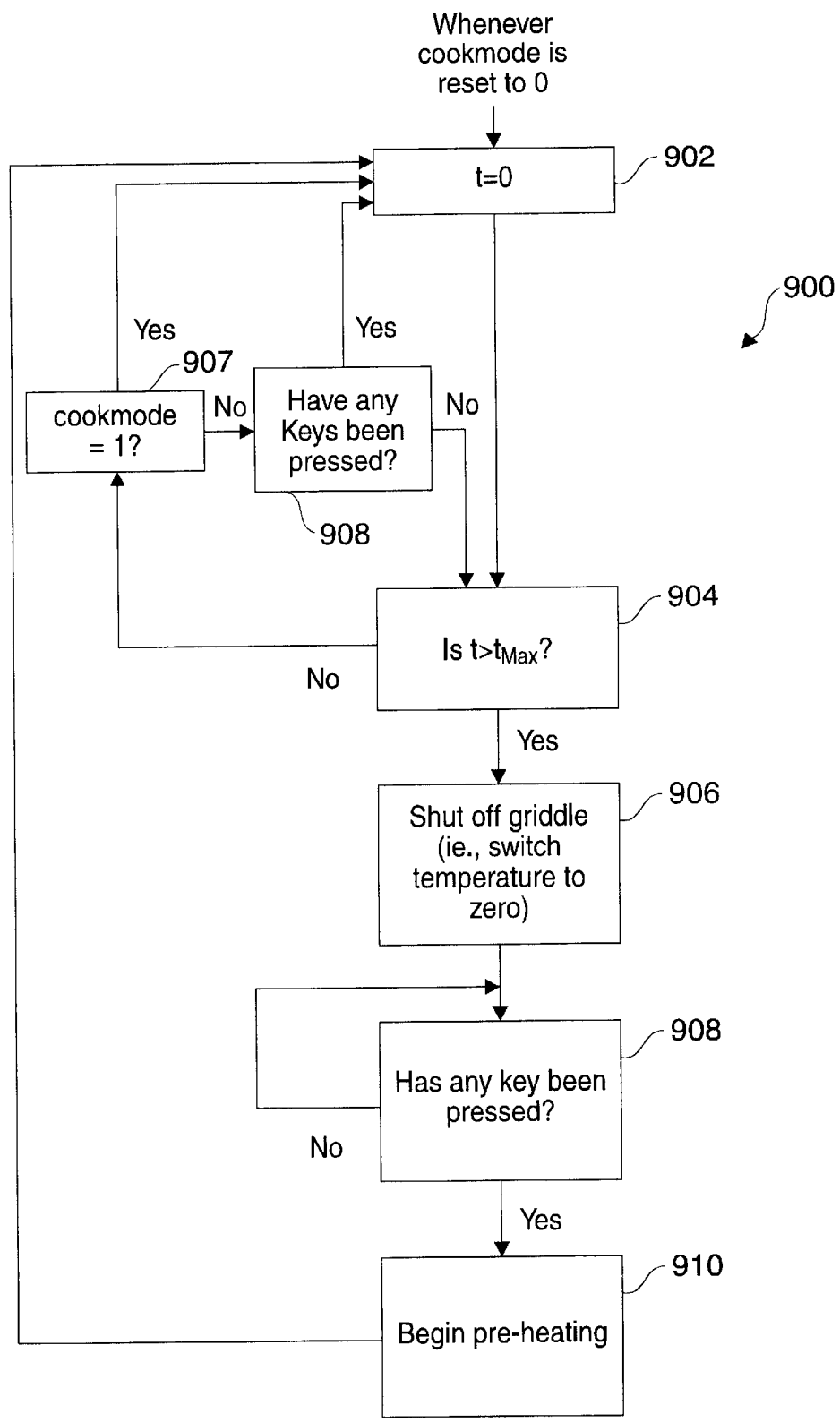
FIG. 9 illustrates an auto shutoff feature that may be utilized as part of this invention.

FIG. 9 illustrates an auto shutoff routine 900 for use with the present invention. With this auto shutoff feature, if no new timing periods are detected, and no keys on the user interface 116 are pressed, within a predetermined period of time (e.g., 16 minutes), then the apparatus automatically shuts itself off, and waits until a key is pressed before heating back up again.

As shown in the approach of FIG. 9, first, a clock timer, t, is reset to zero (0) at the end of a previous timing period, or when a key has been pressed, step 902 (e.g., when cookmode is set to 0). The clock timer (t) keeps track of the time that has passed since the beginning of the current timing period. The value of t is continually compared to a predetermined maximum, $t_{Max}$, step 904, during the current period when a timing period is not in progress, to determine if the time that has passed since the end of the previous timing period has exceeded $t_{Max}$. If t is not greater than $t_{Max}$, the controller checks for a timing period, 906. If there is no timing period in progress, it checks whether any keys have been pressed, 908. If no keys have been pressed, the controller again checks whether t has exceeded $t_{Max}$, 904, and steps 906 and 908 are repeated, accordingly. If, during this loop (steps 902–908), a timing period is detected, step 906, the clock timer, t, is reset to zero, and the loop (902–908) continues to repeat. Similarly, if the controller detects that a key has been pressed, 908, the clock timer, t, is reset to zero, and the loop (902–908) also continues to repeat.

If, during the comparison, step 904, t exceeds $t_{Max}$, indicating that the time that has passed since the end of the previous timing period, or since a key was pressed, exceeds $t_{Max}$, the temperature control of the heating medium automatically shuts off, step 910. In one embodiment of the invention, although the temperature shuts off, the apparatus remains powered on so that the controller may detect whether a key has been pressed, step 912. Once a key has been pressed after automatic shut off, the heating medium again begins to pre-heat, step 914, and operation may continue. Alternatively, when t exceeds $t_{Max}$, the entire device may shut off and remain powered off until turned on again by a user.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed:

1. A method for determining the presence of a food item in contact with a temperature sensor comprising:
   obtaining present time-temperature data associated with the food item;
   comparing the present time-temperature data to predetermined time-temperature data;
   determining whether the food item has been placed in contact with the temperature sensor based on the comparison; and
   causing a predetermined action based on a status of the food item.

2. The method of claim 1 further including inputting user information corresponding to the food item.

3. The method of claim 2 wherein inputting user information includes inputting a type of food corresponding to the food item.

4. The method of claim 3 wherein inputting user information includes inputting a desired level of doneness of the food item.

5. The method of claim 1 wherein causing a predetermined action includes activating a user-perceivable signal.

6. The method of claim 1 wherein obtaining present time-temperature data includes calculating a plurality of delta values.

7. The method of claim 6 further including
   heating the food item for a predetermined period of time after determining from the plurality of delta values that the food item has been placed in contact with the temperature sensor.

8. The method of claim 7 wherein causing a predetermined action includes activating an audio or visual signal when the food item is ready to be flipped.

9. The method of claim 8 further comprising the step of determining whether the food item is done, based on the comparison of the present time-temperature data to the predetermined time-temperature data, and if the food item is not done, repeating the steps of obtaining present time-temperature data, comparing the present time-temperature data to the predetermined time-temperature data, and determining whether the food item is done, until the food item is done.

10. The method of claim 9 further comprising causing a predetermined action based on whether the food item is done.

11. The method of claim 1 wherein causing a predetermined action includes automatically shutting off a heating medium on which the food item is being heated.

12. A method for cooking a food item comprising:
   heating the food item by a heating medium;
   obtaining present time-temperature data associated with the food item;
   comparing the present time-temperature data to predetermined time-temperature data;
   determining whether the food item has been placed in contact with a temperature sensor based on the comparison; and
   causing a predetermined action based on a status of the food item.

13. The method of claim 12 wherein heating includes heating the food item on a surface.

14. The method of claim 12 wherein heating includes heating the food item in a cavity.

15. The method of claim 12 further including inputting user information corresponding to the food item.

16. The method of claim 15 wherein inputting user information includes inputting a type of food corresponding to the food item.

17. The method of claim 12 wherein obtaining present time-temperature data includes successively sensing a plurality of temperatures.

18. The method of claim 17 wherein successively sensing a plurality of temperatures includes periodically sensing one temperature per period over a number of periods.

19. The method of claim 18 further including storing the periodically sensed temperatures in a memory unit.

20. The method of claim 19 further including calculating a plurality of delta values from the plurality of periodically sensed temperatures.

21. The method of claim 12 further comprising determining whether the food item is ready to be flipped, based on the comparison of the present time-temperature data with the predetermined time-temperature data, and if the food item is not ready to be flipped, repeating the step of obtaining present time-temperature data, and determining whether the food item is ready to be flipped, until the food item is ready to be flipped.

22. The method of claim 21 wherein causing a predetermined action includes activating a user-perceivable signal when the food item is ready to be flipped.

23. The method of claim 21 further comprising determining whether the food item is done, based on the comparison of the present time-temperature data with the predetermined time-temperature data, and if the food item is not done, repeating the step of obtaining present time-temperature data, and determining whether the food item is done, until the food item is done.

24. The method of claim 23 wherein causing a predetermined action includes activating a user-perceivable signal when the food item is done.

25. The method of claim 22 wherein activating a user-perceivable signal includes activating a visual signal.

26. The method of claim 22 wherein activating a user-perceivable signal includes activating an audio signal.

27. The method of claim 15 further including simplifying the inputting of user information corresponding to the food item.

28. The method of claim 27 wherein simplifying includes providing a narrowed list of food items that is a subset of a master list of food items.

29. The method of claim 12 further including:
providing at least two sensors, wherein at least one sensor is a control temperature sensor and at least one sensor is a food temperature sensor;
placing the food item in contact with the food temperature sensor and not in thermal relationship with the control sensor;
obtaining the present time-temperature data using the food temperature sensor; and
obtaining control time-temperature data using the control temperature sensor.

30. The method of claim 29 further including:
calculating a plurality of food delta values from the present time-temperature data;
calculating a plurality of control delta values from the control time-temperature data; and
determining a plurality of normalized delta values based on the food delta values and the control delta values.

31. The method of claim 30 further including:
determining from the normalized delta values that the food item has been placed in contact with said food temperature sensor; and
heating the food item for a predetermined period of time.

32. The method of claim 31 further including determining that no food item has been place in contact with said food temperature sensor for a predetermined period of time.

33. The method of claim 32 wherein causing the predetermined action includes automatically shutting off the heating medium after determining that no food item has been placed in contact with said food temperature sensor for a predetermined period of time.

34. An apparatus for determining the status of a food item comprising:
at least one sensor for sensing a plurality of successive temperatures;
a determining means for determining whether the food item has been placed in contact with said at least one sensor based on the plurality of successive temperatures; and
an indicator operably associated with the determining means for indicating a status of the food item.

35. The apparatus of claim 34 wherein the determining means calculates a plurality of delta values based on the plurality of successively sensed temperatures.

36. The apparatus of claim 35 wherein a memory stores the plurality of successively sensed temperatures.

37. The apparatus of claim 36 wherein the determining means determines from the plurality of delta values that the food item has been placed in contact with said at least one sensor.

38. The apparatus of claim 37 further including means for instructing the heating medium to heat the food item for a predetermined period of time.

39. The apparatus of claim 38 further including a means for determining that no food item has been placed in contact with said at least one sensor.

40. The apparatus of claim 39 further including a means for automatically shutting off the heating medium after determining that no food item has been placed in contact with said at least one sensor.

41. The apparatus of claim 40 further including a user interface for inputting user information corresponding to the food item.

42. A system for cooking a food item comprising:
a heating medium for heating a food item;
at least one sensor for sensing a plurality of temperatures at the heating medium;
a means for determining whether the food item has been placed in contact with said at least one sensor based on the plurality of temperatures; and
an indicator signal for indicating a status of the food item.

43. The system of claim 42 wherein the heating medium is a heating surface.

44. The system of claim 42 wherein the heating medium is a heating cavity.

45. The system of claim 42 further including a user interface for inputting user information corresponding to the food item.

46. The system of claim 45 wherein the user information comprises a type of food to be cooked.

47. The system of claim 45 wherein the user information comprises a desired level of doneness of the food item.

48. The system of claim 42 further including a memory unit for storing the plurality of temperatures.

49. The system of claim 48 wherein the plurality of temperatures includes a plurality of successively sensed temperatures.

50. The system of claim 49 further including predetermined delta data, wherein the means for determining whether the food item has been placed in contact with said at least one sensor calculates a plurality of delta values from the successively sensed temperatures, and compares the plurality of delta values with the predetermined delta data.

51. The system of claim 50 where the means for determining whether the food item has been placed in contact with said at least one sensor makes such determination based on the plurality of delta values, and instructs the heating medium to heat the food item for a predetermined period of time.

52. The system of claim 51 further including means for determining that no food item has been placed in contact with said at least one sensor for a predetermined period of time.

53. The system of claim 52 further including a means for automatically shutting off the heating medium after determining that no food item has been placed in contact with said at least one sensor for a predetermined period of time.

54. The system of claim 42 further including a visual signal for indicating when the food item is ready to be flipped.

55. The system of claim 42 further including an audio signal for indicating when the food item is ready to be flipped.

56. The system of claim 42 further including a visual signal for indicating when the food item is done.

57. The system of claim 42 further including an audio signal for indicating when the food item is done.

58. The system of claim 42 further comprising a control temperature sensor for sensing a plurality of control temperatures.

59. A system for cooking a food item comprising:
means for heating the food item by a heating medium;
means for sensing a plurality of temperatures;
means for comparing data relating to the plurality of temperatures with predetermined temperature data;
means for determining whether the food item has been placed in contact with said means for sensing based on the comparison; and
means for causing a predetermined action based on a status of the food item.

60. The system of claim 59 wherein the means for heating is a heating surface.

61. The system of claim 59 wherein the means for heating is a heating cavity.

62. The system of claim 59 further including means for inputting user information corresponding to the food item.

63. The system of claim 62 wherein the means for inputting user information includes a means for inputting a desired level of doneness of the food item.

64. The system of claim 59 wherein the means for sensing a plurality of temperatures includes a means for successively sensing the plurality of temperatures.

65. The system of claim 64 wherein the means for sensing a plurality of temperatures includes a means for periodically sensing one temperature per period over a number of periods.

66. The system of claim 65 further including means for storing a plurality of temperatures.

67. The system of claim 66 further including:
means for calculating a plurality of delta values from the plurality of sensed temperatures; and
means for comparing the plurality of delta values with predetermined delta data.

68. The system of claim 67 including:
means for determining from the plurality of delta values that the food item has been placed in contact with said means for sensing; and
means for heating the food item for a predetermined period of time.

69. The system of claim 68 including means for determining that no food item has been placed in contact with said means for sensing for a predetermined period of time.

70. The system of claim 69 including means for automatically shutting off the heating medium after determining that no food item has been placed in contact with said means for sensing for a predetermining period of time.

71. The system of claim 59 wherein the means for causing a predetermined action is a visual signal.

72. The system of claim 59 wherein the means for causing a predetermined action is an audio signal.

73. The system of claim 62 further including means for simplifying the inputting of user information corresponding to the food item.

74. The system of claim 73 wherein the means for simplifying includes a narrowed list of food items wherein the list is a subset of master list of food items.

75. The system of claim 59 further comprising:
at least two sensors means, wherein at least one sensor means is a control temperature sensor means and at least one sensor means is a food temperature sensor means, and wherein the food item is placed in contact with the food temperature sensor means and not in thermal relationship with the control temperature sensor means;
means for obtaining present time-temperature data using the food temperature sensor means; and
means for obtaining control temperature data using the control temperature sensor means.

76. The system of claim 75 further including:
means for calculating a plurality of food delta values from the present time-temperature data;
means for calculating a plurality of control delta values from the control temperature data; and
means for determining a plurality of normalized delta values based on the food delta values and the control delta values.

77. The system of claim 76 further comprising:
means for determining from the plurality of normalized delta values that the food item has been placed in contact with the food temperature sensor means; and
means for heating the food item for a predetermined period of time.

78. The method of claim 1 wherein said step of determining whether a food item has been placed in contact with the temperature sensor based on the comparison comprises determining whether the food item has been flipped.

79. The method of claim 12 wherein said step of determining whether the food item has been placed in contact with a temperature sensor based on the comparison comprises determining whether the food item has been flipped.

80. The apparatus of claim 34 wherein the determining means for determining whether the food item has been placed in contact with said at least one sensor based on the plurality of successive temperature comprises means for determining whether the food item has been flipped.

81. The system of claim 42 whether the determining means for determining whether the food item has been placed in contact with said at least one sensor based on the plurality of temperatures comprises means for determining whether the food item has been flipped.

82. The system of claim 59 wherein the means for determining whether the food item has been placed in contact with said at least one sensor based on the comparison comprises means for determining whether the food item has been flipped.

* * * * *